United States Patent
Whear et al.

(10) Patent No.: US 9,190,648 B2
(45) Date of Patent: Nov. 17, 2015

(54) LEAD-ACID BATTERY SEPARATOR HAVING ENHANCED STIFFNESS

(75) Inventors: J. Kevin Whear, Utica, KY (US); Jeffrey K. Chambers, Philpot, KY (US); Mohammed Naiha, Chatenois (FR); Tejas R. Shah, Owensboro, KY (US)

(73) Assignee: Daramic LLC, Charlotte, NC (US)

( * ) Notice: Subject to any disclaimer, the term of this patent is extended or adjusted under 35 U.S.C. 154(b) by 91 days.

(21) Appl. No.: 12/129,790

(22) Filed: May 30, 2008

(65) Prior Publication Data

US 2008/0299462 A1 Dec. 4, 2008

Related U.S. Application Data

(60) Provisional application No. 60/941,348, filed on Jun. 1, 2007.

(51) Int. Cl.
*H01M 2/14* (2006.01)
*H01M 2/16* (2006.01)
*H01M 2/18* (2006.01)
*H01M 10/06* (2006.01)

(52) U.S. Cl.
CPC .......... *H01M 2/1653* (2013.01); *H01M 2/1686* (2013.01); *H01M 10/06* (2013.01); *Y02E 60/126* (2013.01)

(58) Field of Classification Search
CPC ........................ H01M 2/1666; H01M 2/1686
USPC .......... 429/247, 143, 144, 249, 251, 252, 254
See application file for complete search history.

(56) References Cited

U.S. PATENT DOCUMENTS

| | | | | |
|---|---|---|---|---|
| 2,016,162 A | * | 10/1935 | Wilderman | 429/252 |
| 5,154,988 A | * | 10/1992 | Choi et al. | 429/145 |
| 5,894,055 A | * | 4/1999 | Young et al. | 429/147 |
| 5,961,769 A | * | 10/1999 | Moue | 156/291 |
| 5,981,029 A | * | 11/1999 | Harada et al. | 428/143 |
| 6,143,441 A | * | 11/2000 | Zguris et al. | 429/144 |
| 2005/0042512 A1 | * | 2/2005 | Ferreira et al. | 429/204 |
| 2010/0279173 A1 | * | 11/2010 | Hying et al. | 429/247 |

FOREIGN PATENT DOCUMENTS

| | | |
|---|---|---|
| DE | 102005042215 A1 * | 3/2007 |
| GB | 685099 A | 12/1952 |
| JP | 2002313305 A * | 10/2002 |
| WO | WO 00/11746 A1 | 3/2000 |
| WO | WO 2004/112166 A2 | 12/2004 |
| WO | WO 2005/012175 A1 | 2/2005 |

OTHER PUBLICATIONS

Nagakubo et al., Machine translation of JP 2002313305 A, Oct. 2002.*

(Continued)

*Primary Examiner* — Sean P Cullen
(74) *Attorney, Agent, or Firm* — Hammer & Associates, P.C.

(57) ABSTRACT

A lead-acid battery separator comprised of a porous membrane substrate having a front surface and a back surface and said front surface having a plurality of ribs. To enhance the substrate's stiffness, one or more coatings of a stiffening material may be adhered to the ribs on the substrate's surface.

17 Claims, 3 Drawing Sheets

(56) References Cited

OTHER PUBLICATIONS

K. Ihmels et al., "Chapter 7, Separator Materials for Valve-Regulated Lead-Acid Batteries," Elsevier B.V., 2004, D.A.J. Rand et al. editors, pp. 183-205.
Jorg Deiters et al., "A New Polyethylene Separator for Heavy-Duty Traction Batteries," Journal of Power Sources 158 (2006), Elsevier B.V., pp. 1069-1072.

M.L. Sorita et al., "Development of High Power VRLA Batteries Using Novel Materials and Processes," Journal of Power Sources 5111 (2002), Elsevier B.V., pp. 1-12.

M. Perrin et al., "Effect of Compression on the Behaviour of Lead-Acid Batteries," Journal of Power Sources 4071 (2000), Elsevier B.V., pp. 1-12.

* cited by examiner

Electrical Resistance Values of Control vs. Silicate Treated

LEAD-ACID BATTERY SEPARATOR HAVING ENHANCED STIFFNESS

RELATED APPLICATION

This application claims the benefit of provisional application Ser. No. 60/941,348 filed Jun. 1, 2007.

FIELD OF THE INVENTION

The invention relates to a lead-acid battery separator made from a porous membrane substrate having enhanced stiffness.

BACKGROUND OF THE INVENTION

A battery is an electrochemical device comprising an anode, a cathode, a separator sandwiched between the anode and cathode, and an electrolyte wetting the separator and in ionic communication between the anode and the cathode. Various chemistries in which the electrochemical potential between various materials is used to generate electricity have been studied and commercially implemented. See, in general: Besenhard, J. O., Ed., *Handbook of Battery Materials*, Wiley-VCH Verlag GmbH, Weinheim, Germany, 1999; and Linden, D., Ed., *Handbook of Batteries*, Second Edition, McGraw Hill Inc., New York, N.Y., 199, both of which are incorporated herein by reference.

A battery separator is used to separate the battery's positive and negative electrodes, and is typically microporous to allow the through passage of ions from the positive and negative electrodes. In lead/acid storage batteries, either automotive or industrial batteries, the battery separator is typically a microporous polyethylene separator having a back web and a plurality of ribs standing on the back web. See: Besenhard, J. O., Editor, *Handbook of Battery Materials*, Wiley-VCH Verlag GmbH, Weinheim, Germany (1999), Chapter 9, pp. 245-292. The separators for automotive batteries are typically made in continuous lengths and rolled, subsequently folded, and sealed along its edges to form pouches that receive the electrodes for the batteries. The separators for industrial (traction) batteries are typically cut to a size about the same as an electrode plate.

The use of porous membrane substrates as separators within lead-acid batteries is known in the prior art. Generally separators are passive and do not directly participate in the electrochemical processes of electricity storage. Separators maintain a physical distance between the positive and negative electrodes in lead-acid batteries. Separators also permit an ionic current with as little hindrance as possible. The unhindered ionic charge transfer requires many open pores of the smallest possible diameter to prevent electronic bridging by deposition of metallic particles (i.e. lead) floating in the electrolyte.

Separators generally have a uniform thickness and a uniform pore distribution. The pore distribution ensures an overall uniform current density during operation, achieving a uniform charging and discharging of the electrodes and maximum battery efficiency. As manufacturers seek to lower production costs, separators have been made thinner, resulting in the separator becoming more flexible. The increase in flexibility may result in battery failures due to internal flexing as a battery is assembled, especially along the folding edges of a pocket separator. The increased flexibility may also cause failure due to internal or external vibrations causing the separator to deform. Lead-acid battery separators generally incorporate ribs running in the MD direction to stiffen the separator. Lead-acid battery separators may also incorporate ribs in the CMD direction. However, the ribs often provide inadequate stiffness to the separator in the MD direction, the CMD direction, or a combination thereof. Hence, a need exists for a lead-acid battery separator with enhanced stiffness.

SUMMARY OF THE INVENTION

A lead-acid battery separator comprised of a porous membrane substrate having a front surface and a back surface and said front surface having a plurality of ribs. To enhance the substrate's stiffness, one or more coatings of a stiffening material may be adhered to the ribs on the substrate's surface.

DETAILED DESCRIPTION

Figure 1:
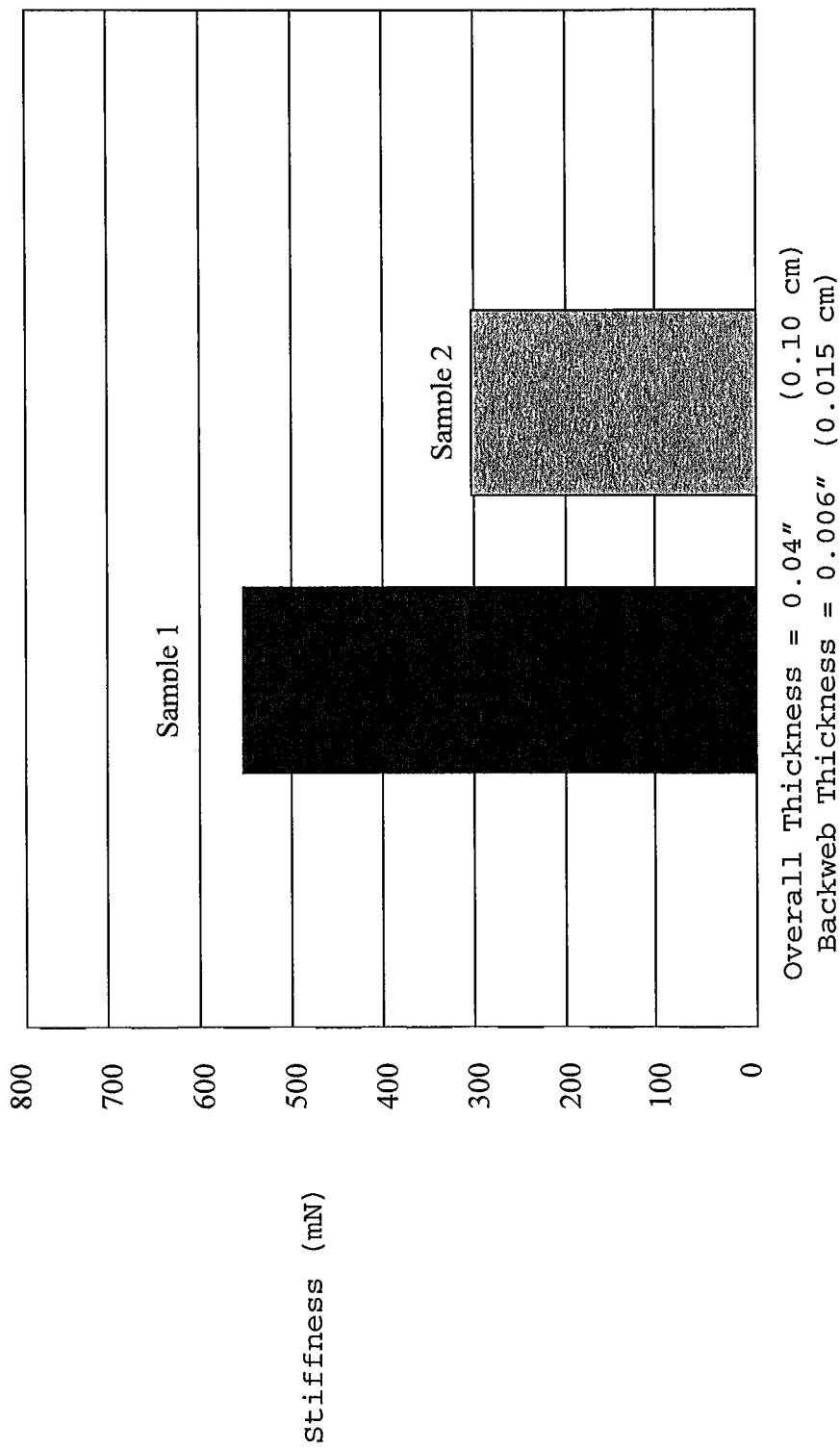
FIG. 1 is a table illustrating the MD stiffness of a control sample in comparison to a sodium silicate treated sample.

This invention relates to a lead-acid battery separator comprised of a porous membrane substrate and one or more coatings of a stiffening material adhered to the substrate's surface. The stiffening material serves to enhance the stiffness of the porous membrane substrate in either the MD direction, the CMD direction, or a combination of both. The stiffness provided by the stiffening material to the porous membrane substrate is most relevant during the manufacturing of the battery separator.

The porous membrane substrate (substrate) may be comprised a variety of materials. Suitable substrate materials include, but are not limited to, polyolefins (including polyethylene, polypropylene, polybutylene, polymethylpentene, mixtures thereof and copolymers thereof), rubber, phenol-formaldehyde resorcinol, glass mat, microporous PVC, and sintered PVC. Polypropylene (including isotactic and atactic) and polyethylene (including LDPE, LLDPE, HDPE, and UHMWPE) and blends thereof and their copolymers are the preferred polyolefins. The substrate may come in a variety of shapes and sizes. The surface of the substrate may incorporate ribs running in the MD direction, the CMD direction, or combinations thereof. In one embodiment of the present invention, the surface of the substrate is flat. In another embodiment, the surface of the substrate has a plurality of ribs running in the MD direction. In still another embodiment, the substrate has a front surface and a back surface and the front surface has a plurality of ribs running in the MD direction. In another embodiment, the substrate with a front surface and a back surface has a plurality of ribs running in both the MD direction and the CMD direction. In still another embodiment, the substrate with a front surface and a back surface has a plurality of ribs running in the MD direction on both the front surface and back surface. In still another embodiment, the substrate with a front surface and a back surface has a plurality of ribs running in both the MD direction and the CMD direction on both the front surface and back surface.

A stiffening material is coated onto the surface of the ribs to stiffen the substrate. Suitable stiffening materials include any substance that may enhance the stiffness of a porous membrane substrate without hindering ionic flow through the substrate. Suitable materials include, but are not limited to, sodium silicate, acrylic co-polymers, polyvinyl alcohols (e.g., polymers used in the textile industry to condition fabrics) and inorganic salts (sodium sulfate and sodium chloride). A coating of solid material such as a glass ($SiO_2$) or PVA will precipitate out and fill the voids in the surface as the solvent evaporates from the stiffening material. The stiffening material forms a porous coating on the surface of the substrate resulting in little to no increase in electrical resistance due to pore blockage. The solution may be dried by any conventional means. In one embodiment of the present invention, the stiffening material may be a sodium silicate solution which is commercially available from the Occidental Chemical Corporation of Dallas, Tex. The sodium silicate solution may be caustic based and may have a pH from eleven to twelve. The sodium silicate solution may be applied at neat concentration or at a reduced concentration by dilution with water. A coating of a glass material ($SiO_2$) precipitates out and fills the voids in the surface as the solvent evaporates from the sodium silicate solution. In another embodiment, the stiffening material may be a polyvinyl alcohol (PVA).

The stiffening material may be applied to the surface of the substrate in any random, non-random, or geometric pattern to enhance the stiffness in the MD direction, the CMD direction, or combinations thereof. In one embodiment of the present invention, the stiffening material may be applied to the ribs of the substrate to increase the stiffness in the MD direction by two to three fold. In another embodiment, stiffness in the CMD direction may be enhanced by two to three fold by applying the stiffening material to the surface of the substrate in any geometric pattern that maintains some degree of perpendicular orientation to the ribs running in the MD direction. In still another embodiment, the stiffening material may be applied to the ribs on the front surface, back surface, or a combination thereof in order to enhance the stiffness of the separator in the MD direction, the CMD direction, or combinations thereof. In still another embodiment, the stiffening material may be applied to the ribs, the front surface of the separator, the back surface of the separator, or any combination thereof in order to enhance the stiffness of the separator in the MD direction, the CMD direction, or combinations thereof.

Figure 2:
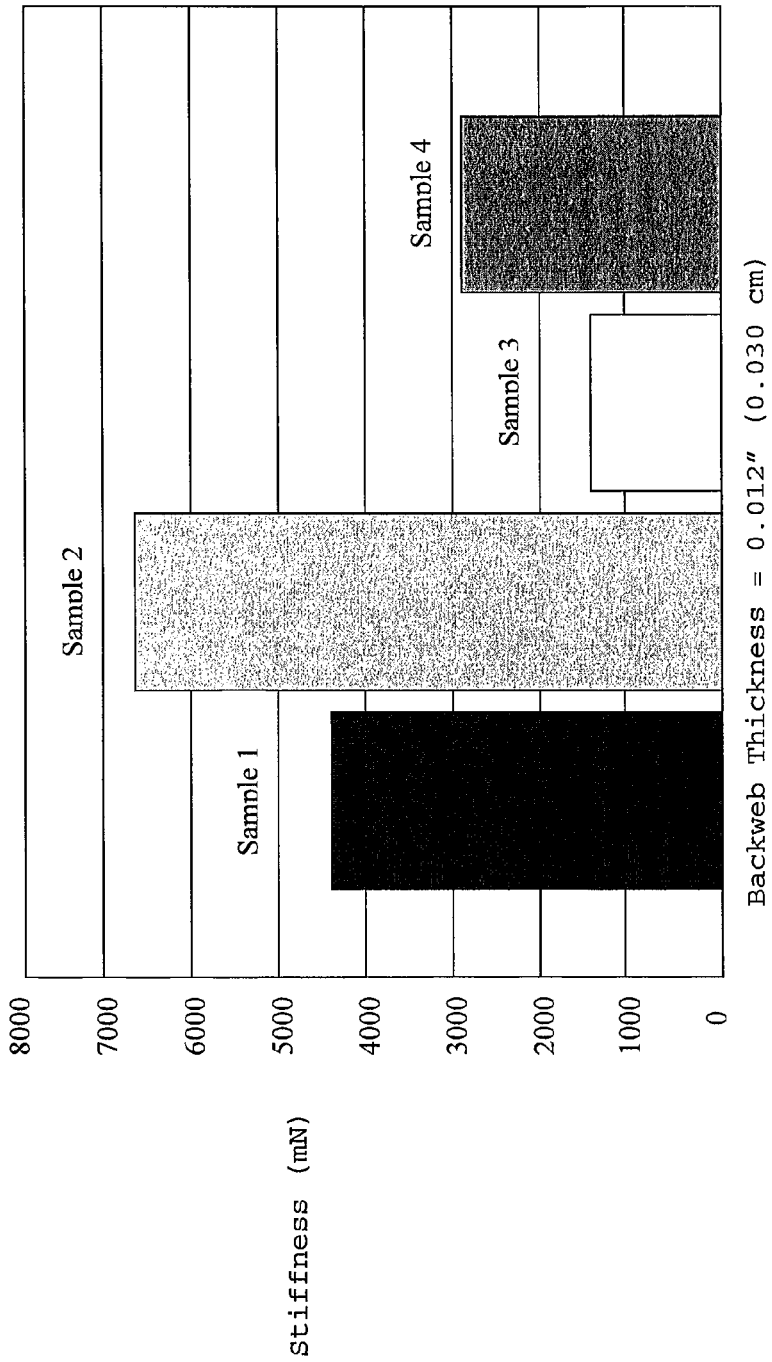
FIG. 2 is a table illustrating the MD/CMD stiffness of control samples in comparison to sodium silicate treated samples.

FIGS. 1 and 2 illustrate embodiments of the substantial differences realized when lead acid battery separators are coated with a stiffening material. The stiffness of each sample was determined using a test apparatus such as the Messmer-Buchel Model K-416 and following a standard testing procedure such as TAPPI T-556 or ISO-2493 wherein the bending angle is 30 degrees and bending length is 5 mm. FIG. 1 illustrates a comparison between a control separator and a separator treated with sodium silicate. The measured stiffness of the control sample was 311 mN while the measured stiffness of the sodium silicate treated sample of the present invention was 572 mN. This is an 84% increase in stiffness provided by the stiffening material, sodium silicate. FIG. 2 illustrates a comparison of a control sample and a sample treaded with sodium silicate used to measure the difference in stiffness in both the MD direction and the CMD direction. Samples 1 and 3 are the untreated controls and Samples 2 and 4 were each treated with a stiffening material, sodium silicate. The measured stiffness of Sample 1 in the MD direction was 4357 mN in comparison to the measured stiffness of Sample 2 which was 6628 mN. This is an increase in stiffness in the MD direction of 52%. The measured stiffness of Sample 3 in the CMD direction was 1401 mN in comparison to the measured stiffness of Sample 4 which was 2766 mN. This is an increase in stiffness in the CMD direction of 97%.

Figure 3:
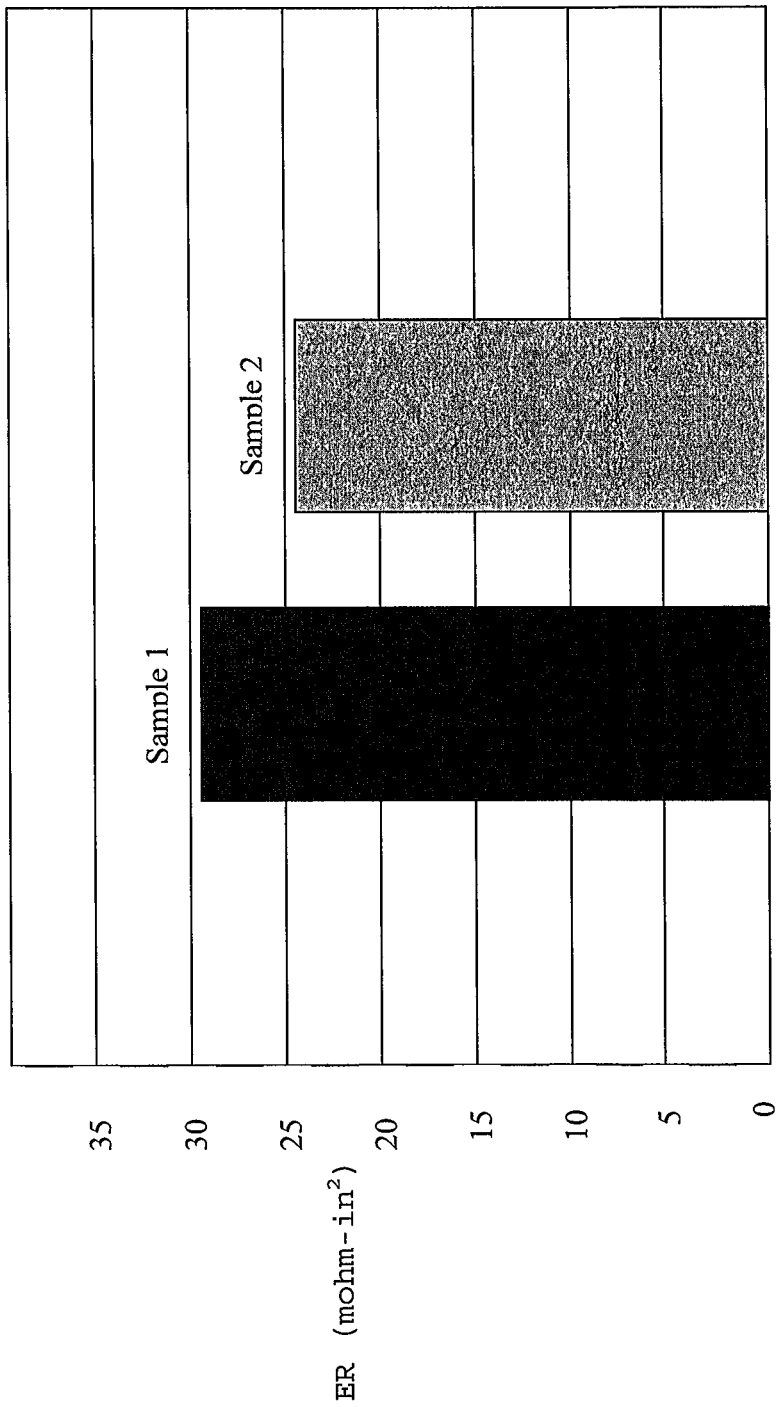
FIG. 3 is a table illustrating the electrical resistance (ER) of a control sample in comparison to a sodium silicate treated sample.

FIG. 3 is a table illustrating the electrical resistance (ER) of a control sample in comparison to a sodium silicate treated sample. The control sample had an electrical resistance (ER) of 29.7 mohm-$in^2$ in comparison to the sample treated with sodium silicate which demonstrated an ER of 24.7 mohm-$in^2$ which is a decrease of 17%.

A lead-acid battery separator as described above may further comprise a glass fiber mat adhered to the porous membrane substrate with the stiffening material previously described to enhance the stiffness in the MD direction, CMD direction, or combinations thereof. Through this process, the stiffening material affixes the glass mat to the separator and substantially increases the stiffness of the glass mat itself. The degree of stiffness obtained will vary by the amount and direction in which the stiffening material is applied. In one embodiment of the present invention, the glass fiber mat may be adhered to any part of a separator including, but not limited to, the front surface of the separator, the back surface of the separator, the ribs, or combinations thereof. In another embodiment, a separator having a glass fiber mat affixed to it will realize an increase in stiffness by five to six fold in both the MD and CMD directions. In still another embodiment, a lead-acid battery separator as described above may further comprise a non-woven mat adhered to the porous membrane substrate with the stiffening material previously described to enhance the stiffness in the MD direction, CMD direction, or combinations thereof.

The stiffening material may also be used to alter the physical properties of a glass fiber mat, such as to increase native puncture properties, tensile strength, and break angle strength. In one embodiment of the present invention, the puncture properties of a glass fiber mat may be increased two-fold after treatment with sodium silicate solution.

The invention also discloses a method of making a lead-acid battery separator which is comprised of a series of steps. The first step is to provide a porous membrane substrate which has a front surface, a back surface, and a plurality of ribs on the front surface. The second step is to apply a stiffening material to the ribs followed by precipitating one or more coatings of a solid material out of said stiffening material. In one embodiment of the above method, the stiffening material is selected from the group comprising: sodium silicate, acrylic co-polymers, polyvinyl alcohol, inorganic salts, or combinations thereof. In still another embodiment, the stiffening material is a sodium silicate or a polyvinyl alcohol. In another embodiment, the stiffening material is a sodium silicate which precipitates out a glass material as its solvent evaporates.

The method of making a lead-acid battery separator may further comprise additional steps. The additional steps include applying the stiffening material to the front surface at some degree of perpendicularity to the ribs followed by precipitating one or more coatings of a solid material out of the stiffening material wherein the stiffening material may be selected from any of the materials described above.

The method of making a lead-acid battery separator may further comprise additional steps. The additional steps include applying the stiffening material to a glass fiber mat followed by adhering the glass fiber mat to the separator on a part of said separator selected from the group comprising: the front surface, the ribs, the back surface, or combinations thereof.

The method of making a lead-acid battery separator may further comprise additional steps which include applying one or more coatings of the stiffening material to the back surface of the separator followed by precipitating one or more coatings of a solid material out of the stiffening material. In one embodiment of the present invention, the one or more coatings of the stiffening material may be adhered to the back surface in a pattern selected from the group comprising: a random pattern, a non-random pattern, a geometric pattern, or a combination thereof.

The stiffening material may also alter the flexural properties of a glass fiber matrices which may be used as separators in Absorptive Glass Mat (AGM) batteries. AGM batteries require a separator with tiny open channels to permit the flow of oxygen from the positive electrode to the negative electrode and yet hamper the free mobility of the electrolyte. The stiffening material is sprayed on to the AGM glass fiber matrix and then washed with a pH 1-6 solution to accelerate glass precipitation. The result is an AGM separator that is more resilient while under pressure within a battery. Additionally, the AGM separator will have a higher void volume which allows for more electrolyte storage in the separator during battery operation. In one embodiment of the present invention, sodium silicate solution is used as the stiffening material.

The present invention also discloses a method of making an AGM battery separator which is comprised of a series of steps. The first step is providing a glass microfiber matrices followed by applying a stiffening material to the matrices and then precipitating one or more coating of a solid material out of the stiffening material. In one embodiment of the present invention, the stiffening material is a sodium silicate which precipitates out a glass material as its solvent evaporates.

The method of making an AGM battery separator may further comprise the steps of washing the glass microfiber matrices with a pH 1-6 solution after the stiffening material is applied followed by precipitating one or more coatings of a solid material out of the stiffening material. The final step is to dry the glass microfiber matrices.

EXAMPLES

The following are some specific examples of Sodium Silicate utilized per the above description:

1. An Ultra High Molecular Weight Polyethylene (UHMWPE) microporous battery separator membrane was obtained from Daramic LLC. The membrane represents a typical separator found in lead-acid energy storage devices to those skilled in the art. The substrate is comprised of a flat microporous backweb having a thickness of 0.007 inches (0.018 cm) and with ribs protruding from the backweb at a height of 0.019 inches (0.048 cm); therefore the separator total thickness is 0.026 inches (0.066 cm). A neat solution of Sodium Silicate (Sigma-Aldrich Chemical) comprised of 14% $Na_2O$ and 27% $Si)_2$ was applied to the surface of the protruding ribs. The subsequent coating weight ranges between 5-10 $g/m^2$. The separator and coated ribs were placed in a conventional oven at 80° C. for ~1 minute to dry. A Messmer-Buchel bending resistance instrument was used to measure the stiffness before and after Sodium Silicate treatment. In this example the MD stiffness was increased by 57%.

2. A Ultra High Molecular Weight Polyethylene (UHMWPE) microporous battery separator membrane was obtained from Daramic LLC. The membrane represents a typical separator found in lead-acid energy storage devices to those skilled in the art. The substrate is comprised of a flat microporous backweb with thickness of 0.007 inches (0.018 cm) and with ribs protruding from the backweb at a height of 0.015 inches (0.038 cm); therefore the separator total thickness is 0.023 inches (0.058 cm). In this example a neat solution of Sodium Silicate with composition identical to that used in example #1 was applied to a non-woven glass mat with thickness of 0.010 inches (0.025 cm). The glass mat (Owens Corning Corp.) is typical of that utilized by those skilled in the art of battery separator construction; a typical basis weight for this material is 40 $g/m^2$. A typical Sodium Silicate coating weight applied to the glass mat is in the range of 50-100 $g/m^2$. The Sodium Silicate wetted glass mat was applied to the ribbed surface of the UHMWPE separator and was then placed in a conventional forced air oven at 80° C. for ~2 minutes. The glass mat/separator composite was tested on a Messmer-Buchel bending resistance device and the resulting MD stiffness was increased by 5.5 times over the commercially available Daramic LLC control. The CMD stiffness was also increased by a factor of 5.5 times over the aforementioned control sample.

3. A microfiber glass AGM separator (Hollingsworth & Vose Co.) was sprayed with the Sodium Silicate solution utilized in examples #1 and 2, above. Immediately following the silicate application a pH 3 buffer solution was applied by air pressure spray to achieve pH neutralization and precipitate glass within the AGM matrix. The treated AGM separator was dried at 80° C. for 5 minutes. A comparison of resiliency was made by compressing the treated sample at constant pressure while monitoring the change in thickness. It was demonstrated that the treated material exhibited a marked resistance to compression over the control when identical pressure to the separator face was applied.

4. An Ultra High Molecular Weight Polyethylene (UHMWPE) microporous battery separator membrane was obtained from Daramic LLC. The membrane represents a typical separator found in lead-acid energy storage devices to those skilled in the art. The substrate is comprised of a flat microporous backweb having a thickness of 0.007 inches (0.018 cm) and with ribs protruding from the backweb at a height of 0.019 inches (0.048 cm); therefore the separator total thickness is 0.026 inches (0.066 cm). A saturated solution of 98% hydrolyzed Polyvinyl alcohol (PVA)(Sigma-Aldrich Chemical) was applied to the entire flat backweb surface of the separator membrane. The separator and coated backweb were placed in a conventional oven at 80° C. for approximately 5 minutes to dry. A Messmer-Buchel bending resistance instrument was used to measure the stiffness before and after PVA treatment. In this example the MD stiffness was increased by at least 50%. The ER was measured for the separator completely coated on the backweb (most aggressive case) and the PVA coating was observed to completely dissolve in the acid thus rendering an ER equivalent to the control uncoated separator. (In the above Example 4, when the same PVA solution was applied to the ribs only, there was no measurable stiffness increase. Again following Example 4, when the same PVA solution was applied in various perpendicular patterns to the backweb an increase in stiffness between 20-50% was achieved.)

The present invention may be embodied in other forms without departing from the spirit and the essential attributes thereof, and, accordingly, reference should be made to the appended claims, rather than to the forgoing specification, as indicated in the scope of the invention.

We claim:
1. A lead-acid battery separator comprising:
   a porous polyolefin membrane substrate having a flat microporous backweb with a front surface and a back surface;
   said front surface having a plurality of machine direction ribs protruding from the backweb; and
   a coating of a stiffening material adhered to said ribs, said stiffening material being selected from the group consisting of: sodium silicate, acrylic co-polymers, polyvinyl alcohols, inorganic salts, and combinations thereof, wherein said adhered stiffening material on said ribs provides an increase in stiffness in at least one of the machine direction or cross machine direction when compared to said porous polyolefin membrane substrate without said coating.

2. The lead-acid battery separator of claim 1 further comprising said coating of said stiffening material adhered to said front surface.

3. The lead-acid battery separator of claim 1 further comprising:
   a glass fiber mat being adhered to said separator on a part of said separator selected from the group consisting of: said front surface, said ribs, said back surface, and combinations thereof.

4. The lead-acid battery separator of claim 1 wherein said stiffening material being at least one of a polyvinyl alcohol or a sodium silicate.

5. The lead-acid battery separator of claim 1 wherein said stiffening material being a sodium silicate.

6. The lead-acid battery separator of claim 1 wherein said coating being a plurality of coatings of said stiffening material adhered to at least one of said ribs or said back surface.

7. The lead-acid battery separator of claim 1 wherein said coating of said stiffening material being adhered to said back surface in a cross machine direction pattern being selected from the group consisting of: a random pattern, a non-random pattern, a geometric pattern, and a combination thereof.

8. The lead-acid battery separator of claim 1 further comprising:
   a glass fiber mat being adhered to said membrane by said coating of stiffening material.

9. A method of making a lead-acid battery separator comprising the steps of:
   providing a porous polyolefin membrane substrate having a front surface, back surface, and a flat microporous backweb;
   said front surface having a plurality of machine direction ribs;
   applying a stiffening material to said ribs, said stiffening material selected from the group consisting of: sodium silicate, acrylic co-polymers, polyvinyl alcohols, inorganic salts, and combinations thereof; and
   precipitating a coating of a solid material out of said stiffening material on said ribs.

10. The method of claim 9 wherein said stiffening material being at least one of a polyvinyl alcohol or a sodium silicate.

11. The method of claim 9 further comprising the steps of:
    applying said stiffening material to a glass fiber mat; and
    adhering said glass fiber mat to said separator on a part of said separator selected from the group consisting of: said front surface, said ribs, said back surface, and combinations thereof.

12. The method of claim 9 further comprising the steps of:
    applying said stiffening material to at least one of said ribs or said back surface; and
    precipitating a coating of a solid material out of said stiffening material.

13. The method of claim 12 wherein said coatings of said stiffening material being adhered to said back surface in a cross machine direction pattern being selected from the group consisting of: a random pattern, a non-random pattern, a geometric pattern, and a combination thereof.

14. The method of claim 9 wherein said coating being a plurality of coatings.

15. A lead-acid battery separator comprising:
    a porous polyolefin membrane substrate having a flat microporous backweb with a front surface and a back surface;
    said front surface having a plurality of machine direction ribs protruding from the backweb; and
    a coating of a stiffening material adhered to at least one of said ribs, said stiffening material being selected from the group consisting of: sodium silicate, acrylic co-polymers, polyvinyl alcohols, inorganic salts, and combinations thereof, wherein said adhered stiffening material on at least one of said ribs provides an increase in stiffness in at least one of the machine direction or cross machine direction when compared to said porous polyolefin membrane substrate without said coating.

16. The lead-acid battery separator of claim 15 further comprising:
    a glass fiber mat being adhered to said separator on a part of said separator selected from the group consisting of: said front surface, said ribs, said back surface, and combinations thereof.

17. The lead-acid battery separator of claim 15 wherein said coating being a plurality of coatings of said stiffening material adhered to at least one of said ribs, said back surface, or said front surface.

* * * * *